US010940640B2

(12) United States Patent
Taniguchi et al.

(10) Patent No.: US 10,940,640 B2
(45) Date of Patent: Mar. 9, 2021

(54) PRINTHEAD DISPENSING DEPOSITION MATERIAL, METHOD OF FORMING PRINTED OBJECT, FLOW PATH STRUCTURE BODY AND HEATING PLATE FOR DISPENSING DEPOSITION MATERIAL FROM FLOW PATH

(71) Applicant: HIT DEVICES LTD., Kyoto (JP)

(72) Inventors: Hideo Taniguchi, Kyoto (JP); Shigemasa Sunada, Kyoto (JP)

(73) Assignee: HIT DEVICES LTD.

( * ) Notice: Subject to any disclaimer, the term of this patent is extended or adjusted under 35 U.S.C. 154(b) by 459 days.

(21) Appl. No.: 15/574,936

(22) PCT Filed: Oct. 15, 2015

(86) PCT No.: PCT/JP2015/079184
§ 371 (c)(1),
(2) Date: Nov. 17, 2017

(87) PCT Pub. No.: WO2016/185627
PCT Pub. Date: Nov. 24, 2016

(65) Prior Publication Data
US 2018/0162049 A1    Jun. 14, 2018

(30) Foreign Application Priority Data

May 19, 2015 (JP) .............................. JP2015-102185
Jun. 24, 2015 (JP) ................................. 2015-127059

(51) Int. Cl.
| | | |
|---|---|---|
| B29C 67/00 | (2017.01) | |
| B29C 64/209 | (2017.01) | |
| B33Y 10/00 | (2015.01) | |
| B33Y 30/00 | (2015.01) | |

(Continued)

(52) U.S. Cl.
CPC .......... B29C 64/209 (2017.08); B29C 64/112 (2017.08); B29C 64/295 (2017.08);
(Continued)

(58) Field of Classification Search
CPC ... B29C 64/112; B29C 64/209; B29C 64/295; B33Y 10/00; B33Y 30/00; B33Y 50/00; B33Y 50/02; B41J 2/14
See application file for complete search history.

(56) References Cited

U.S. PATENT DOCUMENTS

| | | |
|---|---|---|
| 2005/0012247 A1 | 1/2005 | Kramer et al. |
| 2005/0052486 A1 | 3/2005 | Kodama |

(Continued)

FOREIGN PATENT DOCUMENTS

| | | |
|---|---|---|
| JP | 5798373 | 6/1982 |
| JP | 2004255614 | 9/2004 |

(Continued)

OTHER PUBLICATIONS

Extended European Search Report, European Application No. 15892626, dated Aug. 2, 2018.

(Continued)

*Primary Examiner* — Ryan M Ochylski
(74) *Attorney, Agent, or Firm* — Perman & Green, LLP

(57) ABSTRACT

A building material discharge head is provided with, a flow path structure which, by stacking multiple plate-form bodies having a through-hole and closing both ends of the through-holes, forms a flow path in the direction orthogonal to the through-holes and in a long direction of an elongate shape of the through-holes, and in which a discharge opening is formed in at least one end of the body to communicate with the path, a thin plate which closes one side of the path, which is at one end of the through-holes, a heating plate which is provided on the opposite side and which heats the inside of the path, a closing plate which is provided on the other surface of the path, which is the other end of the through- (Continued)

holes, and an LED which is provided near the discharge opening and which irradiates light along the direction of the path.

5 Claims, 11 Drawing Sheets

(51) Int. Cl.
    *B41J 2/17*     (2006.01)
    *B41J 2/14*     (2006.01)
    *B29C 64/112*     (2017.01)
    *B29C 64/295*     (2017.01)
    *B33Y 50/00*     (2015.01)
    *B29C 64/386*     (2017.01)

(52) U.S. Cl.
    CPC ............ *B29C 64/386* (2017.08); *B29C 67/00* (2013.01); *B33Y 10/00* (2014.12); *B33Y 30/00* (2014.12); *B33Y 50/00* (2014.12); *B41J 2/14* (2013.01); *B41J 2/17* (2013.01)

(56) References Cited

U.S. PATENT DOCUMENTS

| | | | |
|---|---|---|---|
| 2005/0219349 A1* | 10/2005 | Takeya | B41J 2/33585 347/204 |
| 2008/0030554 A1 | 2/2008 | Sugahara | |
| 2008/0032554 A1 | 2/2008 | Sugahara | |
| 2013/0297063 A1 | 11/2013 | Kritchman et al. | |
| 2015/0151540 A1* | 6/2015 | Chen | B41J 2/14 347/44 |

FOREIGN PATENT DOCUMENTS

| | | |
|---|---|---|
| JP | 2005041219 | 2/2005 |
| JP | 2005104135 | 4/2005 |
| JP | 2013067035 | 4/2013 |

OTHER PUBLICATIONS

International Preliminary Report on Patentability, International Application No. PCT/JP2015/079184, dated Nov. 30, 2017.
Kadota, K. (2013). Digital Art of Design and Manufacturing by 3D Printer. Nikkan Kogyo Shimbun, LTD. ISBN 978-4-526-07143-0 C3053.
The Imaging Society of Japan. (2008). Ink Jet. The Imaging Society of Japan, 7-9, 35. ISBN 978-4-501-62340 C3072.
International Search Report, International Application No. PCT/JP2015/079184, dated Jan. 26, 2016.

* cited by examiner

PRINTHEAD DISPENSING DEPOSITION MATERIAL, METHOD OF FORMING PRINTED OBJECT, FLOW PATH STRUCTURE BODY AND HEATING PLATE FOR DISPENSING DEPOSITION MATERIAL FROM FLOW PATH

CROSS-REFERENCE TO RELATED APPLICATIONS

This application is the National Stage of International Application No. PCT/JP2015/079184, having an International Filing Date of 15 Oct. 2015, which designated the United States of America, and which International Application was published under PCT Article 21 (2) as WO Publication No. 2016/185627 A1, and which claims priority from and the benefit of Japanese Application No. 2015-102185, filed on 19 May 2015, and Japanese Application No. 2015-127059, filed on 24 Jun. 2015 the disclosures of which are incorporated herein by reference in their entireties.

TECHNICAL FIELD

The present invention relates to a printhead dispensing deposition material for discharging a deposition material and a method of forming for a three-dimensional fabrication, in the case where a three-dimensional fabricated object is manufactured with a 3D printer, and a flow path structure body and a heating plate for discharging the deposition material from a flow path, which are used for the printhead dispensing deposition material and the method of forming.

BACKGROUND ART

In recent years, manufacturing a three-dimensional fabricated object with a 3D printer using a computer has become popular. In such 3D printers, a three-dimensional model is expressed as a collection of sectional shapes. Thus, a 3D printer discharges a deposition material to a predetermined spot by three-dimensionally moving a nozzle which discharges a deposition material or by moving a table for the fabricated object in order to form a fabricated object. One example of materials for forming such fabricated object includes materials which are formed into a melted state by increasing temperatures thereof such as thermoplastic resins and metals having a low melting point. Also, a photofabrication method, in which a photo-curable resin (such as an ultraviolet-curing resin) is selectively cured by lighting, and an inkjet method, in which a photo-curable resin, a thermoplastic resin, a wax, or the like is discharged from an inkjet nozzle for laminate fabrication, are known.

As a device discharging such deposition material, for example, one having a configuration as shown in FIG. 10 is known (see, for example, Non Patent Document 1). Specifically, in FIG. 10, a nozzle 61 is screwed into one end side of a heater block 63, a barrel 62 is screwed into the other end side, and a wire-shaped or stick-shaped deposition material is inserted to the barrel 62. Then, a deposition material is delivered from the barrel 62 at a constant rate, the deposition material is heated and melted by the heat of the heater block 63, and the melted deposition material is discharged at a fixed amount each time from a discharge opening (orifice) 61a at a tip of the nozzle 61. The position of the discharge opening 61a is moved relatively in xyz directions by means of computer control in such a way that it traces a desired three-dimensional drawing. From this, the melted deposition material is discharged to manufacture a fabricated (formed) object in a desired three-dimensional shape. There is a heater, which is not illustrated, provided around this heater block 63 for heating the heater block 63 to a predetermined temperature so that the deposition material is melted.

On the other hand, in the inkjet method which is mainly used to form a two-dimensional image, ink drops (droplets) are discharged from a plurality of nozzles to perform image formation on a predetermined recording medium. In this recording head, pressure variation is caused by a piezoelectric device in a pressure chamber communicating with a nozzle by an actuator so that an ink droplet is discharged from a nozzle opening. Also, a method of thermal inkjet is known, in which a heater (a heating element) is disposed at the bottom of a nozzle, local heating by the heater causes bubbling of ink, the ink is boiled due to bubble coalescence thereof, and then the ink is discharged (see pages 7 to 9, and 35 of Non Patent Document 2).

PRIOR ART DOCUMENT

Non-Patent Document

Non-Patent Document 1: "Digital Art of Design and Manufacturing by 3D Printer" (written by Kazuo Kadota, issued by NIKKAN KOGYO SHIMBUN, LTD., 103 Pages)

Non-Patent Document 2: "Ink Jet" (issued by The Imaging Society of Japan on Sep. 10, 2008)

SUMMARY OF THE INVENTION

Problem to be Solved by the Invention

As mentioned above, in the configuration where the cylindrical nozzle 61 and the barrel 62 are manufactured and are fixed to the heater block 63, there is a problem with increase in material cost and manufacturing cost. Further, for materials in a liquid form at room temperature like photo-curable resins, the heater block and the barrel are not necessary, but in the case of a cylindrical nozzle, when the resin is cured in the nozzle, the nozzle cannot be used, which is wasteful.

Further, for discharging the deposition material, the deposition material is discharged continuously or intermittently while relatively moving the discharge nozzle and the fabricated object. Therefore, it is impossible to discharge the deposition material in parallel into a plurality of necessary small areas on the same plane unlike a two-dimensional ink jet method. Meanwhile, even if the above-mentioned ink-jet method is intended to be used on the printhead for the deposition material, the ink-jet method utilizes a piezoelectric effect of a piezoelectric element, and therefore, an amount of volume change thereof is very small. Therefore, the ink-jet method may be used when an amount of the deposition material is one for two-dimensional printing of a character or an image on a paper. However, it is impossible to discharge a large amount of a deposition material at a time for producing a fabricated object. As a result, the ink-jet method can be used to produce a small fabricated object, but is not suitable for production of a large fabricated object. Namely, in the ink-jet method, it takes a long time to produce a three-dimensional fabricated object and the ink-jet method is not realistic.

Further, in a thermal system, in which a heater is arranged, a deposition material having a high viscosity such as one which is a fluid but not a liquid cannot be boiled. In other words, there is a problem that the thermal system cannot be applied to a high-viscosity deposition material. Therefore, as mentioned above, a method, in which a deposition material is continuously discharged from a nozzle, is generally employed.

The present invention has been made to solve the problems mentioned above, and an object thereof is to provide a printhead dispensing deposition material which can discharge a specific amount of a deposition material to a predetermined spot even if the deposition material is one such as a photo-curable resin which is a fluid but not a liquid and has a high viscosity, and can produce a fabricated object in a short period of time while scanning either of a discharge (dispense) opening or a fabrication (forming) table.

Another object of the present invention is to provide a flow path structure body which has a simple structure and can be formed at low cost without using a cylindrical, thread-cut, and thus expensive nozzle but with low-cost materials such as a plate material.

Still another object of the present invention is to provide a heating plate being capable of discharging a deposition material through a desired plurality of discharge openings simultaneously by a heating effect.

Still another object of the present invention is to provide a method of forming of a three-dimensional fabricated object for producing a fabricated object by discharging a deposition material from only a desired flow path by applying a heating effect to the flow path in which the deposition material is flowed.

Means to Solve the Problem

The printhead dispensing deposition material for three-dimensional fabrication (forming) of the present invention comprises a flow path structure body, wherein the flow path structure body is formed by jointing plural plates of a substantially same shape having a through-hole with an elongate cross-section, and closing both ends of the through-hole, to form a flow path in a direction vertical to the through-hole and in a lengthwise direction of the through-hole with the elongate cross-section, and to have a discharge opening communicating with the flow path, the discharge opening being formed at tips of at least one of the plates; a thin plate for closing one surface of the flow path on one end side of the through-hole; a heating plate disposed at the side opposite to the flow path with the thin plate provided therebetween and applying a heating effect to the inside of the flow path; a closing plate disposed on the other surface of the flow path, the other surface being the other end side of the through-hole; and a light-emitting element disposed near the discharge opening to emit a light along the direction of the flow path.

The flow path structure body of the present invention has a flow path plate made by jointing at least two plates having an elongate through-hole so that the through-holes are aligned with each other, and closing plates closing the through-holes on both surfaces of the flow path plate, wherein a discharge opening communicating with the through-hole, having a width thinner than a width of the through-hole and reaching a tip portion is formed on at least one plate constituting the flow path plate, and the deposition material passes through the through-hole as a flow path thereof and is discharged from the discharge opening.

The heating plate of the present invention is a heating plate for a printhead dispensing deposition material for discharging a deposition material from each of flow paths of a flow path structure body having a plurality of flow paths arranged in parallel by a heating effect, comprising; an insulating substrate, heating elements formed on the insulating substrate so as to correspond to each of the plurality of flow paths, and a pair of electrodes formed so that a voltage can be applied individually to both ends of the respective heating elements.

The method of forming of a three-dimensional fabricated object of the present invention is a method of forming of a three-dimensional fabricated object using a photo-curable resin, wherein the method comprises: forming a thin plate on one surface of a flow path for discharging a deposition material comprising the photo-curable resin, disposing a heating plate at the side opposite to the flow path with the thin plate provided therebetween, and applying a heating effect instantaneously only to a specific flow path due to the heating plate, thus forming the three-dimensional object while discharging the deposition material from a specific flow path.

Effects of the Invention

According to the printhead of the present invention, a heating plate for applying a heating effect to the flow path through a thin plate is provided on one side wall of the flow path of the deposition material, and therefore, when the printhead has a plurality of flow paths, the deposition material can be discharged against a plurality of small areas (pixels) at the same time. In addition, since the deposition material is discharged by expansion of the deposition material or deformation of the thin plate due to the heating effect, much larger amount of deposition material as compared with discharging by an ink-jet can be discharged at a time. As a result, even a liquid deposition material such as a photo-curable resin having a high viscosity is photo-cured while discharging a large amount of deposition material against a plurality of small areas (pixels), and therefore, even a large fabricated object can be formed in a short period of time.

Further, according to the flow path structure body made from a plate, since inexpensive plate material can be used and yet the flow path is formed very easily, reduction of cost can be achieved. In addition, since the flow path is formed by a through-hole and the discharge opening is formed by a recess on the plate, manufacturing of the flow path structure body is very easy. In this flow path structure body, the deposition material is not limited to a photo-curable resin, and this flow path structure body can also be used even for a usual heat-melting type printhead. Namely, the heating plate for heating the deposition material in the flow path is provided on one side wall of this flow path structure body, and the heating plate for driving the discharging is provided on the other side wall via the thin plate. Therefore, the flow path structure body can be used in the same manner as in the case of the above-mentioned photo-curable resin.

According to the heating plate of the present invention, heating is performed for the respective flow paths and a heating effect can be applied individually to each flow path, and therefore, when a plurality of flow paths are formed, the plurality of flow paths can be controlled individually.

According to the method of forming of a three-dimensional fabricated object of the present invention, even in the case of using a photo-curable resin as the deposition material, by forming a plurality of flow paths, the deposition material can be discharged against plural desired spots at a time, and a large size fabricated object can be produced in a short period of time.

EMBODIMENT FOR CARRYING OUT THE INVENTION

Figure 1A:
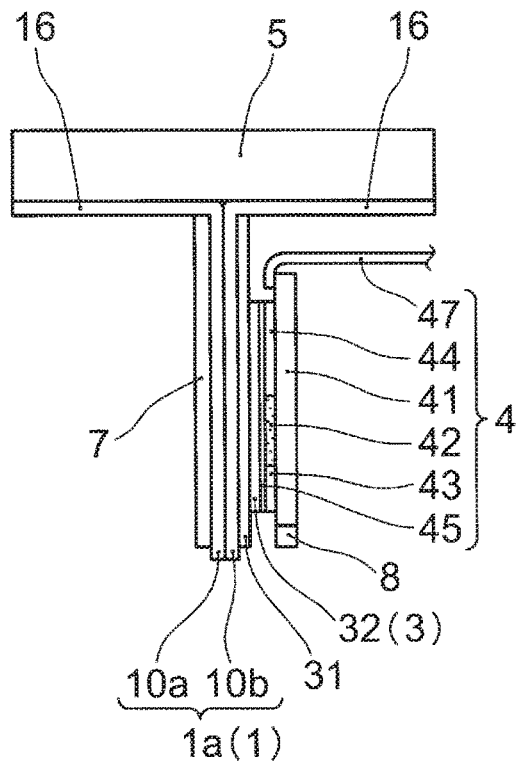
FIG. 1A is a side view illustrating a printhead dispensing deposition material of one embodiment of the present invention.
Figure 1B:
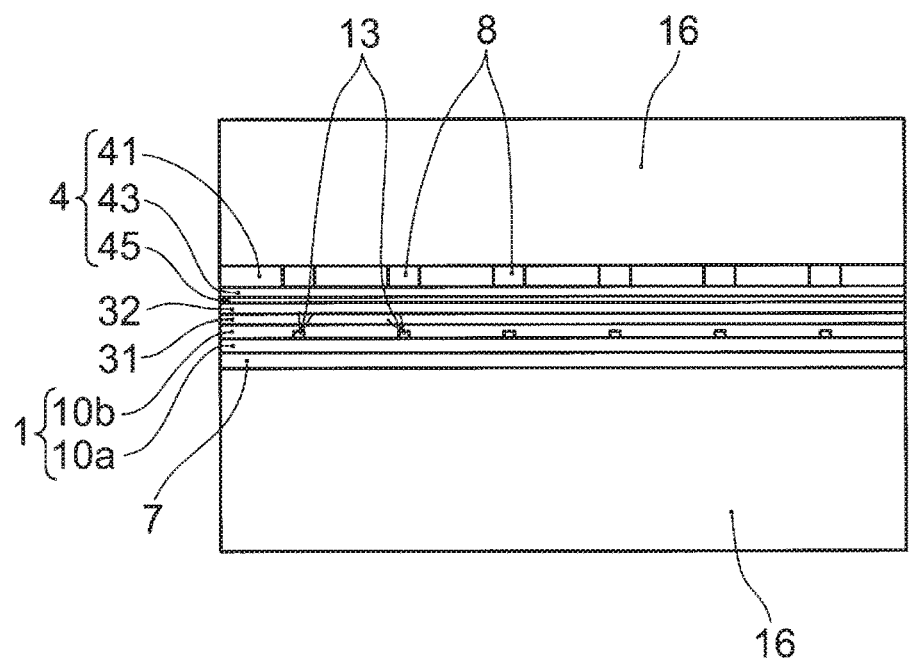
FIG. 1B is a plan view of the discharge opening side of the printhead of FIG. 1A.
Figure 2:
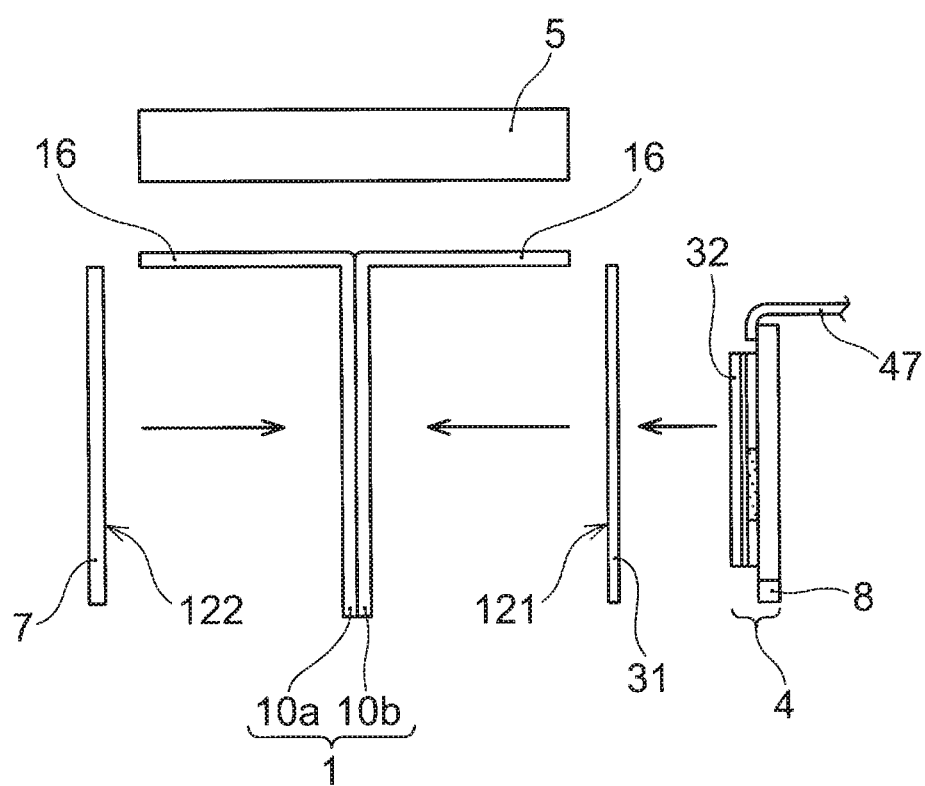
FIG. 2 is an explanatory exploded view of FIG. 1A.

Next, in reference to the drawings, the printhead dispensing deposition material of the present invention, and a flow path structure body and a heating plate to be used therefor are described. FIG. 1A and FIG. 1B show a side view of the printhead dispensing deposition material of one embodiment of the present invention and a plan view seen from a discharge opening side thereof, respectively, and FIG. 2 shows an exploded view thereof. The printhead dispensing deposition material of this embodiment, as shown in the exploded view of FIG. 2, comprises: a flow path structure body 1 in which by jointing plural plates 10 (10a, 10b) of a substantially same shape having a through-hole with an elongate cross-section, and closing both ends of the through-hole, a flow path 12 is formed in a direction vertical to the through-hole and in a lengthwise direction of the through-hole with the elongate cross-section, and a discharge opening (orifice) 13 communicating with the flow path 12 is formed at at least one end of the plates 10; a thin plate 31 for closing one surface of the flow path 12 on one end side of the through-hole; a heating plate 4 disposed at the side opposite to the flow path 12 with the thin plate 31 provided therebetween and applying a heating effect to the inside of the flow path 12; a closing plate 7 disposed on the other surface of the flow path 12 which is the other end side of the through-hole; and a light-emitting element (LED) 8 disposed near the discharge opening 13 and emitting light along the direction of the flow path. The LED 8 is used for solidification of a discharged (dispensed) deposition material such as a photo-curable resin.

The photo-curable resin is a resin cured with light, for example, a resin to be cured with ultraviolet light having a wavelength of about 300 to 400 nm or a resin to be cured with visible light having a wavelength of not less than 400 nm. The above-mentioned LED 8 may be one emitting light having a wavelength being capable of curing the photo-curable resins.

In one embodiment, the flow path structure body 1 has a flow path plate 1a made by jointing at least two plates 10 (10a, 10b) having elongate through-holes so that the through-holes are at least aligned with each other and closing plates 31, 7 for closing the through-hole on both surfaces of the flow path plate 1a, and is structured such that a discharge (dispense) opening 13 communicating with the through-hole, having a width smaller than that of the through-hole and reaching a tip portion is formed on at least one plate 10 forming the flow path plate 1a, and the through-hole is used as the flow path 12 of the deposition material and the deposition material is discharged from the discharge opening 13. The closing plate is not limited to the closing plate 7 and the thin plate 31 provided for closing, and for example, the heating plate for heating the deposition material may be provided so that the insulating substrate of the heating plate directly close the through-hole.

Figure 3:
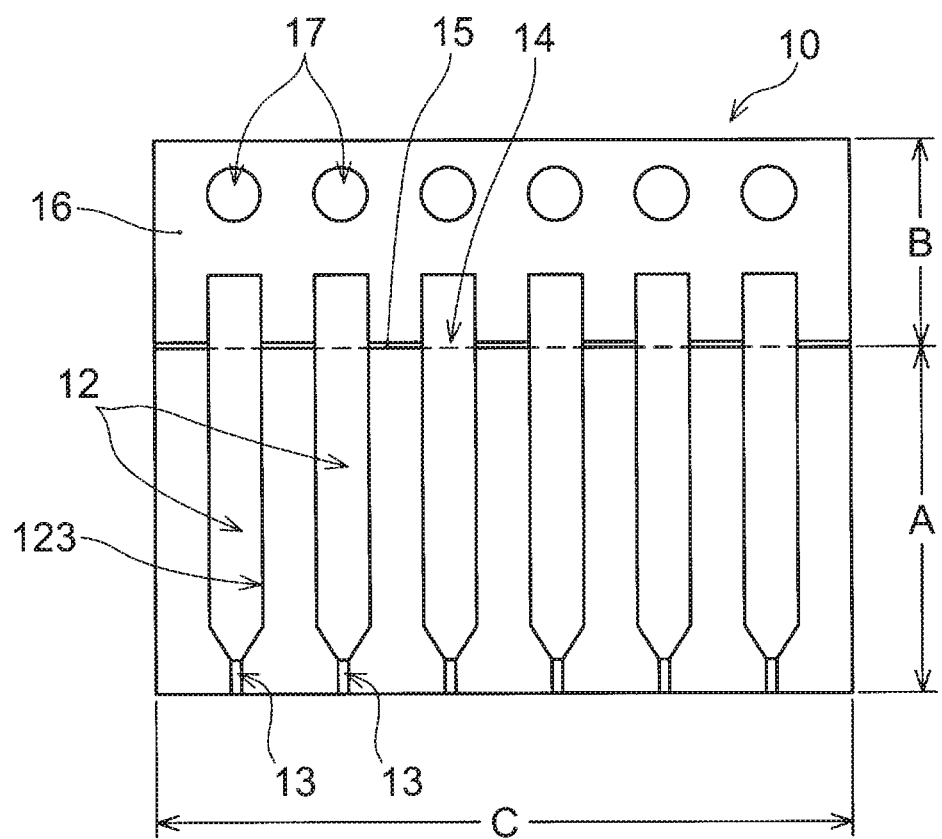
FIG. 3 is one example of a plan view illustrating one plate of the flow path structure body of FIG. 1A.

In examples shown in FIGS. 1A and 1B, two plates 10a and 10b (or 10 when the both are referred to altogether as shown in FIG. 3) are put together and bonded. As shown in FIG. 3, the flow path 12 is formed on each of the plates 10 as the through-hole, so that the deposition material flows therein. In addition, the discharge openings 13 are formed at the respective one tip portions of the flow paths 12 and connected therewith. The discharge opening 13 may be formed as a recess having a depth of about a half of the thickness of the plate 10 without penetrating through the plate 10. This recess is formed by half-etching, stamping, machining, or other methods. The shape of this recess (sectional shape of the discharge opening 13) is not limited to the rectangular shape as shown in FIG. 1B, and may be a circular shape or other shape. The number of the discharge openings 13, namely the number of the recesses is as many as needed in accordance with its intended use. Further, when these recesses are formed, a groove 15 (see FIG. 3) of a similar recess is formed at a position adapted to the length of the printhead so that the plates 10 can be easily bent there at a right angle. The neighborhood of this bending portion of the through-hole becomes a material supply openings 14. This material supply opening (orifice) 14 is formed so as to communicate with an opening 51 (see FIG. 6A and FIG. 7A)

to be formed on an attaching plate 5. As shown in FIG. 2, the bent portion becomes an attaching portion 16 to be fixed to the attaching plate 5. 17 are holes (through-holes) for fixing the flow path structure body 1 to the attaching plate 5 with screws.

The plates 10 are formed from a material excellent in heat conductivity and easy to be processed to have the through-holes 17 and the recesses. From this point of view, a thin metal plate is preferable. As one example, the plate 10 shown in FIG. 3 is a stainless steel plate with a thickness of about 0.6 mm. A dimension A from a tip end of the discharge opening 13 up to the groove 15 for folding is 13 mm, a dimension B from the groove 15 up to a tip portion opposite to the discharge opening 13 is 7.5 mm, and a width C is 10 mm. However, these dimensions are examples, and the dimensions are not limited thereto. Further, a width of the flow path of 2 mm, a width of the discharge opening 13 of 0.4 to 0.8 mm, and a diameter of the through-hole 17 of 3.2 mm are exemplified. In the case of a stainless steel plate of such a thickness, the flow path 12, the through-hole 17 and the external shapes thereof can be easily formed by punching process. The external shapes are formed in various sizes depending on applications. The shape of a surrounding part of the discharge opening 13 is also formed freely depending on applications. When the flow path structure body is formed using such plates 10, the flow paths 12 are formed by the through-holes on the plates 10 and the discharge opening 13 is formed as a recess formed in the depth about a half of a thickness of the plate 10. Therefore, a material cost and a manufacturing cost become very low. Furthermore, the flow paths 12 are formed by the through-holes and the closing plates 7, 31 (thin plates) closing the both ends thereof. The closing plate 7 is preferably a thin plate material or a film.

Further, the plate thickness is also not limited to one exemplified above, and the plates having various thicknesses can be used depending on applications. Furthermore, the number of plates 10 to be put together is not limited to two, and can be increased more. When the number of plates to be put together is increased, a number of discharge openings 13 connecting with the same flow path 12 can be formed, and a printhead dispensing deposition material being capable of changing its discharge amount can be obtained. Namely, the discharge opening 13 is formed by forming a recess communicating with the through-hole 12 on at least one of a plurality of the plates 10 of the flow path structure body 1. It should be noted that each of the plates 10 is formed as shown in FIG. 3, and the external shape and the portion of the flow path 12 are common in each of the plates 10. However, the recesses to be formed as the discharge openings 13 are different in the shape and the number thereof. For example, in the plates 10 shown in FIG. 8C for forming discharge openings 13C, recesses are formed symmetrically by two plates 10. When the discharge opening 13 is formed by putting the two plates 10 together as mentioned above, the recesses are not limited to those having the same size and the same shape. A recess of 0.4 mm width may be put together with a recess of 0.2 mm width, and a rectangular recess may be faced to a circular recess.

The discharge opening 13 is formed, for example, by half-etching. Namely, the discharge opening 13 is formed by forming a resist mask on a part other than a part where the discharge opening 13 is formed and dipping in an etching solution or spray-etching for spraying an etching solution. Also, electrolytic etching can be performed. A depth of etching is controlled according to a period of time of exposure to an etching solution. In the case of too deep etching, a mechanical strength decreases, and therefore, it is preferable that the etching depth is about a half of a thickness of the plate 10 or less. In the case where the plate 10 is thin and a larger discharge opening 13 cannot be formed, for example, as shown by the discharge opening 13 in FIG. 8C, by forming similar recesses at facing positions of the two plates 10 (as mentioned above, the positions of the recesses differ from each other in the two plates 10), the discharge openings 13c having a depth of the both recesses are formed when the plates 10 are jointed. Further, in the case of forming the recesses by stamping with a metal mold, or the like, a spherical or cylindrical recesses can be formed depending on a shape of the metal mold or the like. In the case of the stamping as mentioned above, formation of the recesses and other process such as punching (for external shape and the through-hole 17), processing of the groove 15 or folding are performed simultaneously or continuously.

For example, two plates 10 in which the through-holes (the flow paths 12) and the recesses (the discharge openings 13) are formed are put together and bonded with, for example, a heat resistant adhesive or the like. Then, the plates are bent at the groove 15 (see FIG. 3) to the opposite directions respectively, and the folded attaching portions 16 are fixed to the attaching plate 5, thereby forming the flow path structure body 1, as shown in FIG. 2. Even if the groove 15 is not formed, folding or cutting of the plates can be performed. At the time of putting them together, the above-mentioned through-hole 17, a projecting part of the external shape, and the like can be used for alignment. It should be noted that in the case of three plates 10, the middle plate is cut.

When the thin plate 31 and the closing plate 7 are jointed to this flow path structure body 1, they may be adhered, for example, with a heat resistant adhesive, however, an adhesive which allows easy detachment is preferable. The jointing also may be conducted by screwing and the like. By jointing them detachably, disassembling and cleaning can be carried out even when the deposition material becomes hardened in the flow path 12. As a result, maintenance becomes easy.

As shown in FIG. 3, a plurality of the flow paths 12 can be formed in parallel with each other in a direction perpendicular to the extending direction of the flow paths 12. The respective first side wall portions of the plurality of flow paths 12 are formed from the thin plates 31, the heating plate 4 is provided via the thin plate 31, the heating plate 4 is formed so as to heat only the specific flow path 12 among the plurality of flow paths 12, and accordingly the flow path structure body is formed so that the deposition material is discharged (dispensed) only from the specific flow path 12 by instantaneously heating of the heating plate 4 (several milliseconds in heating with the heating plate 4, meanwhile a heating effect on the deposition material is several tens milliseconds in consideration of heat conductivity).

On the other surface side of the flow path structure body 1, the closing plate 7 is jointed so as to close openings of the through-holes forming the flow paths 12 in the same manner as in the thin plate 31. The second side wall portion 122 (see FIG. 2) is formed by this closing plate 7. It is preferable that the closing plate is jointed in an easily disassemblable manner to facilitate disassembling and cleaning of the flow path structure body 1. For this closing plate 7, a material having a low heat conductivity is preferable, however, it is preferable that a material having the same thermal expansion coefficient as that of the insulating substrate 41 of the heating plate 4 or the same material as the insulating substrate 41 is used because warping due to difference between the thermal expansion coefficients can be prevented.

As shown in FIG. 1A, the thin plate 31 is provided on one surface of this flow path structure body 1 as a first side wall surface 121 (see FIG. 2) of the flow path 12. Further, a heating plate 4 being capable of locally heating the flow path 12 is provided via a thermal strain generating member 32. The deposition material in the flow path 12 can be discharged by deformation of the thin plate 31 caused by instantaneous heating of the heating plate 4. The closing plate 7 is provided on the other surface of the flow path structure body 1 to configure a second side surface (see FIG. 2) of the flow path 12. It should be noted that a third side wall surface of the flow path 12 is formed from the side wall (thick part of the plate 10) of the through-hole of the flow path plate 1a, and the flow path 12 is a fully closed path. While this printhead is formed into a structure not required to heat the deposition material, in the case where it is necessary to heat the deposition material in the flow path 12 of the flow path structure body 1, a heating plate for heating the deposition material may be provided instead of the closing plate 7.

When there are a plurality of the flow paths 12, the heating plate 4 provided on one surface side of the flow path structure body 1 is formed so that it can heat each of the flow paths 12 respectively by application of a selective pulsed current by an external signal. When a pulsed voltage is applied to a specific flow path 12 by the heating plate 4, the flow path 12 is heated via the thin plate 31 and the deposition material inside the flow path 12 is expanded. As a result, the deposition material in the flow path 12 is pushed out and discharged from the discharge opening 13 of the flow path 12. Thus, in this example, the thermal strain generating member 32 (3) shown in FIG. 1A is not necessary. In other words, the deposition material in the flow paths 12 can be discharged according to a volume increase of a deposition material in the specific flow path 12 or a volume change of the flow paths 12 caused by a thermal expansion of the thin plate 31, using the heating plate 4.

In this case, when the thin plate 31 is formed from a material having a large thermal expansion coefficient, it is expanded along the flow paths thereof and then the deposition material can be discharged by a change of the thin plate 31 in the same manner as in the thermal strain occurring member, which will be described below. Also, even though the thermal expansion coefficient of the thin plate 31 is not large, when the temperature of the deposition material is directly raised, the volume of the material itself is increased. As a result, the deposition materials in the flow paths 12 are pushed toward the discharge openings 13 and discharged from the discharge openings 13. In this case as well, when the heating plate 4 is heated instantly, the expansion occurs instantly, and when the heat-generating action is cancelled, the temperature drops instantly and the volume is reduced to normal. As a result, in any method, the deposition material is discharged instantly, and subsequently the discharging stops. It should be noted that the deposition materials are supplied from the side of the deposition material supply openings and the deposition materials being in a fluid state in the flow paths 12 is kept being in a fluid state in the flow paths 12. A viscosity of this deposition material varies with kind of a photo-curable resin, and any of them is a fluid, and thus, with the discharge openings 13 being set on the bottom side, the deposition material is filled into the flow paths 12 by the self-weight. When it does not fall by the self-weight, it can be always kept filled in the flow path 12 by applying pressure.

Figure 4A:
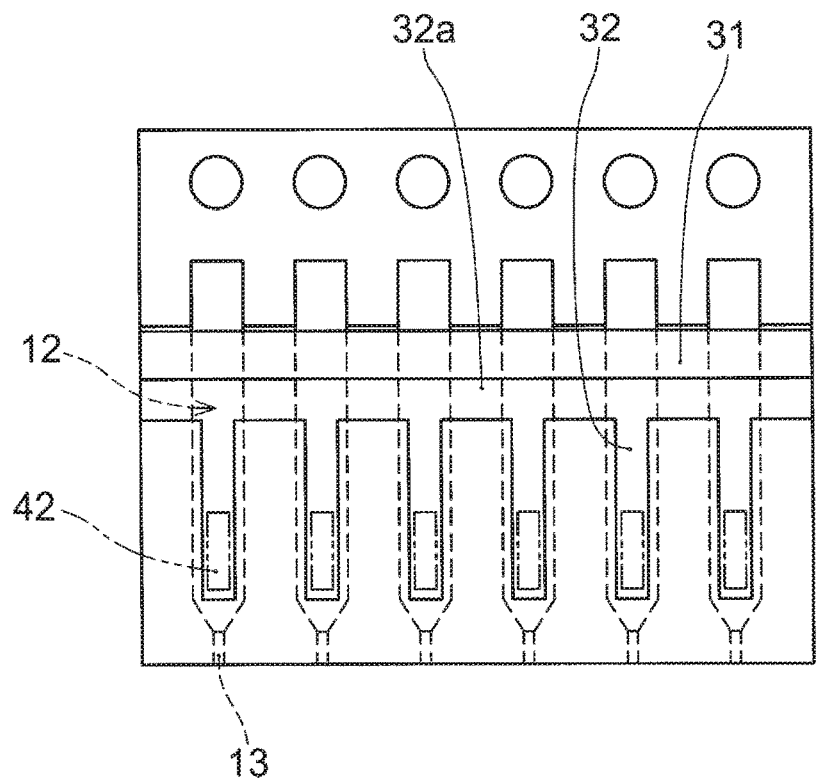
FIG. 4A is a plan view illustrating one example of a thermal strain generating member which is one example of a heating effect by the heating plate of FIG. 1A.

On the other hand, as shown in FIG. 1A, the thermal strain generating member 3 (the piece 32 formed from a metal piece or a non-metal piece; see FIG. 4A) may be affixed to the thin plate 31 between the thin plate 31 and the heating plate 4. This thermal strain generating member 3 is formed by the piece 32 (see FIG. 4A), or the like along each of the flow paths 12, for example, with a material having a different thermal expansion coefficient from the thin plate 31. When this piece 32 is heated, warpage deformation occurs to the thin plate 31 due to the difference in the thermal expansion coefficients between the thin plate 31 and the piece 32. In this case, a width of the piece 32 is preferably narrower than a width of the flow path because the thin plate 31 is deformed and pierces into the flow path 12 when the thermal expansion coefficient of the piece 32 is larger than that of the thin plate 31. On the other hand, if the thermal expansion coefficient of the piece 32 is smaller than that of the thin plate 31, the thin plate 31 is deformed to be pulled outward. Therefore, in this case, the width of the piece 32 is not limited. When the thin plate 31 is deformed to pierce into the inside, the deposition material in the flow path 12 is pushed out accordingly. Also, even if the thin plate 31 is pulled outward, because heating by the heating plate 4 is an instantaneous pulsed heating, the heating stops immediately, and the deformation of the thin plate 31 is reversed. Thus, the volume inside the flow path 12 is increased temporarily and subsequently reduced to normal, and while it is being reduced, the deposition material in the flow path 12 is pushed and discharged from the discharge openings 13. Therefore, the thermal expansion coefficients of the thin plate 31 and the piece 32 need to be different; however, it does not matter which is larger. A bimetal may be affixed directly to the thermal strain generating member 3, as will be described below, even though there is no difference in a the thermal expansion coefficient between the thermal strain generating member 3 and the thin plate 31. Detailed examples of that will be described with reference to FIGS. 4A-4C and 5A-5C.

FIG. 4 shows a structural example in which the piece 32 is attached to the thin plate 31. In FIG. 4A, heaters 42 of the heating plate 4 are illustrated by two-dot chain lines to show positions thereof. This thin plate 31 is affixed so as to cover one side of each of the plurality of the flow paths 12 of the flow path structure body 1 shown in the above-mentioned FIG. 3. In other words, it is easy and preferable to form the thin plate 31 so that one thin plate 31 closes one side of all of the flow paths 12. This thin plate 31 may be, for example, a metal plate formed of an aluminum alloy sheet having a width of about 0.6 mm, a porous ceramic which is easy to be deformed, or a heat-resistant insulating film such as polyethylene or polytetrafluoroethylene. The material is preferably heat-resistant, easy to be deformed, and excellent in heat transferring.

For this thin plate 31, various materials such as a material having a large thermal expansion coefficient and easy to be deformed and a material having a small thermal expansion coefficient and easy to be deformed, are used in accordance with intended use thereof. Examples of the former include a copper alloy such as brass and an aluminum alloy (duralumin) having a thermal expansion coefficient of 20-30 ppm/° C. Examples of the latter include a metal plate such as Fe alloys (with different ratios of Fe—Ni—Cr) and stainless steel having a thermal expansion coefficient (a coefficient of linear expansion) of about 6 ppm. A non-metal plate may also be used. For this thin plate 31, a material having any thickness of about 0.05-0.6 mm can be used in accordance with its intended use. For example, when the thin plate 31 is formed so as to be deformable by heating along with the piece 32 as the thermal strain generating member 3, the thin plate 31 and the piece 32 are affixed together and heated to deform the thin plate 31 based on the difference of the thermal expansion coefficients of the thin plate 31 and the piece 32, and accordingly the deposition material in the flow path 12 can be discharged. In this case, for the thin plate 31, a material having a thermal expansion coefficient widely different from that of a first piece 32 and easy to be deformed is selected. For example, when the above-mentioned aluminum alloy plate (coefficient of linear expansion: 23 ppm/° C.) or copper alloy (coefficient of linear expansion: about 20 ppm/° C.) is used for the thin plate 31, a 42 Fe—Ni alloy plate (coefficient of linear expansion: 6 ppm/° C.) having a thickness of about 0.1-0.2 mm can be used for the pieces 32. Here, for the plates 10 constituting the flow path structure body 1, a ferroalloy is used.

It should be noted that, for example, a bimetal can be affixed to the thin plate 31 as the thermal strain generating member 3, which will be described below, without employing this thermal expansion coefficient of the thin plate 31. In this case, the thermal expansion coefficient of the thin plate 31 is preferably small. In addition, it may also be possible that, without providing the thermal strain generating member 3, the deposition material in the flow paths 12 is heated and expanded or thermal expansion is caused to the thin plate 31 itself for discharging. In this case, the thin plate 31 is preferably one having a large thermal expansion coefficient and being easily deformed, and an insulating film or the like may be used. It should be noted that while metals are raised as examples of the thin plate 31 and the pieces 32, materials thereof are not limited to metals, and those other than metals, for example, ceramics used for a ceramic package for semiconductor, a plate of inorganic compound such as a piezoelectric material, quartz glass (coefficient of linear expansion: 0.5 ppm/° C.), and the like may be used.

For example, when the flow path 12 has dimensions of 1 mm (width)×1 mm (depth)×5 mm (length)=5 µl (microliter)=5,000 nl (nano liter), the discharge amount (determined by the size of the discharge opening 13) is 0.3 mm×0.3 mm×0.05 mm (thick)=0.0045 mm$^3$=4.5 nl, and the coefficient of volumetric expansion of ABS is $(6-13) \times 10^{-5}$ per 1° C. Therefore, assuming it is $10 \times 10^{-5}$, the volume is expanded by 0.1% by 10° C. increase (when the temperature of 10% of the inside of the flow path 12 is raised by 100° C., the average temperature rise is 10° C.). Therefore, in the case of 5,000 nl×0.1%=5 nl, it is larger than the above discharge amount, and for discharging a small amount, just the thermal expansion of the deposition material is enough.

Also, the piece 32 constituting the thermal strain generating member 3 is formed along each of the flow paths 12, and in the example shown in FIG. 4A, those are coupled together at the root side thereof (at the side opposite to the discharge openings) by a coupling portion 32a and formed in a shape of comb tooth. Because the root side is away from the position of the heaters 42, its temperature is hardly raised. Therefore, there will be no influence resulting from a difference between the thermal expansion coefficients of the pieces 32 and the thin plate 31. On the other hand, although it is laborious to affix the pieces 32 along each of the flow paths 12 one by one, the coupling portion 32a allows alignment of the pieces 32 to each of the flow paths 12 to become very easy. Therefore, the pieces 32 can be affixed after the coupling portion 32a is aligned. What is illustrated in FIG. 4A is that the thin plate 31 is affixed to the surface of the flow path structure body 1, and the pieces 32 are affixed to the surface thereof, wherein positions of the heaters 42 of the heating plate 4 which are provided thereupon are illustrated by two-dot chain lines. Specifically, the tip sides of the pieces 32 are heated. Consequently, temperature increase by the heating plate 4 is hardly provided on the coupling portion 32a.

Figure 4B:
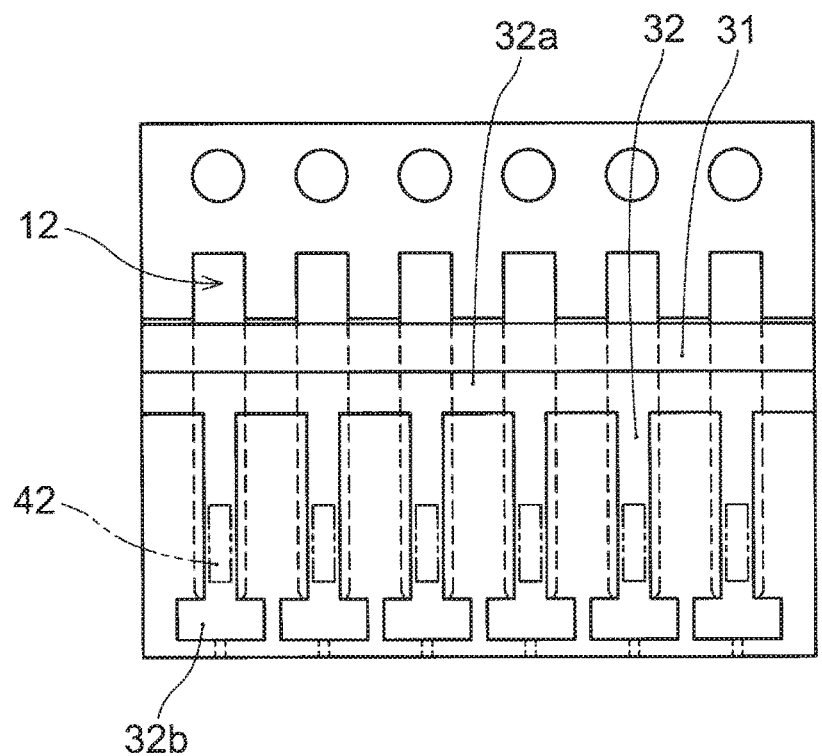
FIG. 4B is a view similar to FIG. 10A which shows a variation of FIG. 4A.

The example shown in FIG. 4B is a view similar to FIG. 4A and the root sides of the pieces 32 are coupled by the coupling portion 32a, and in addition to that, hat portions 32b are formed on the tip side of each of the pieces 32. These hat portions 32b are, without being coupled together, separately formed on each of the pieces 32 along the flow paths 12. When such hat portions 32b are formed, the pieces 32 and the thin plate 31 are more strongly adhered, and peeling is less likely to occur even against a heat cycle. Specifically, a temperature near the heater 42 of the heating plate 4 is raised, and a stress resulting from the difference between the thermal expansion coefficients is produced. Thus, a peeling force becomes larger. However, the temperature of the hat portions 32b is not raised so much, and thus a stress caused by a thermal strain is less likely to be applied. Consequently, the both ends of the pieces 32, where a stress tends to be applied, are fixed tightly by the coupling portions 32a and the hat portions 32b. Thus, the peeling force of the pieces 32 is suppressed.

Figure 4C:
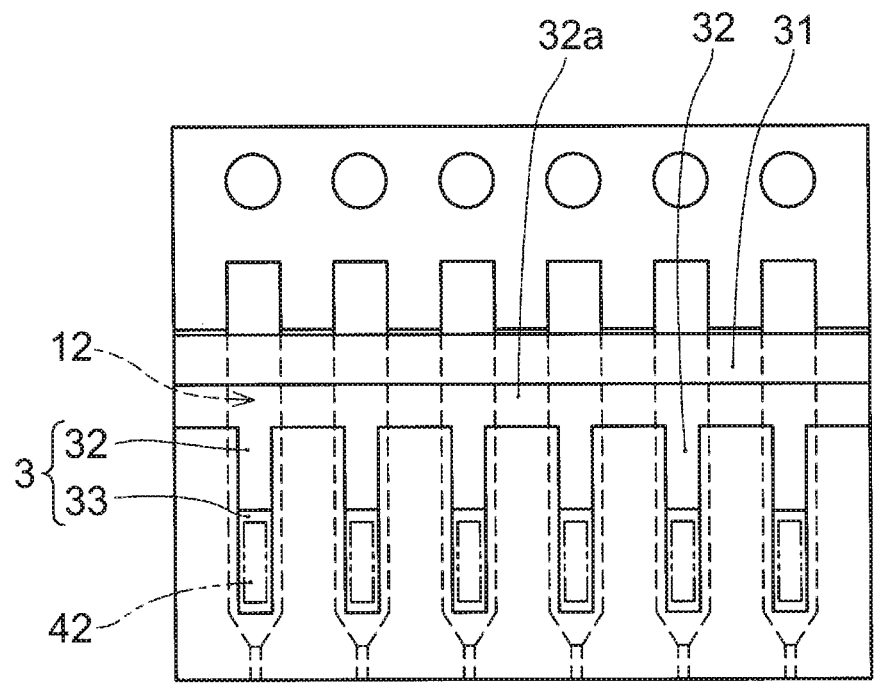
FIG. 4C is a view similar to FIG. 10A which shows a variation of FIG. 4A.

FIG. 4C is an example showing another embodiment of the thermal strain generating member 3. Specifically, in this example, deformation due to the difference between the thermal expansion coefficients of two kinds of materials is formed by the above-mentioned pieces 32 and second pieces 33, without employing the difference between the thermal expansion coefficients of the pieces 32 and the thin plate 31. In this case, a thin organic film such as an insulating film can be used because the thermal expansion coefficient of the thin plate 31 does not matter. In this case, deformation due to difference between the thermal expansion coefficients of the pieces 32 and the second pieces 33 occurs. The deformation causes the thin plate 31 to be pushed inward or pulled, thereby discharging the deposition material. In this case, there may be used separated pieces 32, without being coupled by the coupling portions 32a, and a commercially available bimetal can be used. Specifically, the thermal strain generating member 3 is formed from a bimetal formed by bonding at least two kinds of plate materials having different thermal expansion coefficients, and the bimetal can be bonded to the thin plate 31 along the flow paths 12. In this case as well, when the second pieces 33 or the bimetal are affixed in such a way that the thin plate 31 is pulled outward, the width of the bimetal is not limited; however, when the thin plate 31 is deformed in such a way that it pierces into the flow paths 12, a width of the second pieces or bimetal is preferably narrower than a width of the flow paths 12. Also, in this case as well, the second pieces 33 are not limited to metal pieces, and may be non-metal pieces. It should be noted that the thermal strain generating member 3 is not limited to just two kinds of materials having different thermal expansion coefficients and affixed together and in addition to the two kinds of materials having different thermal expansion coefficients, a third plate material having an intermediate thermal expansion coefficient may be interposed between them. Thus various variations can be made.

Figure 5A:
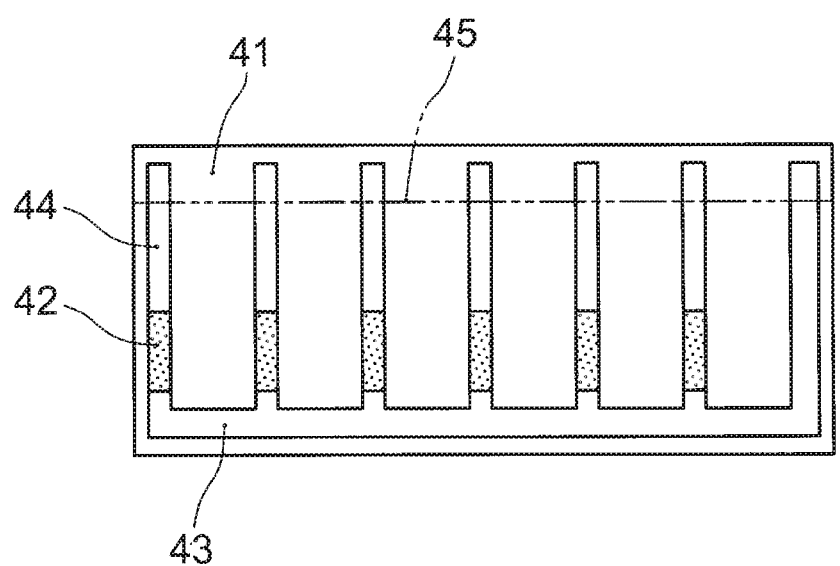
FIG. 5A is a plan view illustrating one example of the heating plate of FIG. 1A where the cover substrate is removed.
Figure 5B:
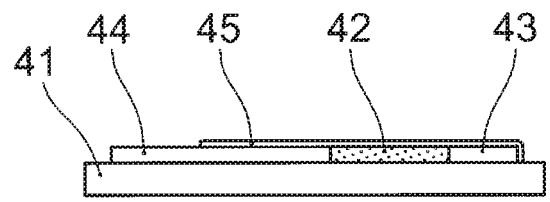
FIG. 5B is an explanatory side view illustrating a layer structure of FIG. 5A.

FIG. 5A and FIG. 5B are a plan view and a side view for explaining one example of the heating plate 4. FIG. 5B shows a side view, and FIG. 5A shows a plan view in which there is no protection film 45. Namely, the heater 42 comprising a heating element is formed on the insulating substrate 41, and at both end portions thereof are formed a first conducting terminal 43 (electrode) and a second conducting terminal 44 (electrode). At the top surface of the heating plate is provided the protection film 45 formed from glass or the like to protect the heater 42 and the first and second conducting terminals 43, 44.

An insulating substrate made of alumina or the like and being excellent in thermal conductivity is used as the insulating substrate 41. For the shape and dimension thereof, as the number of discharge openings 13 increases depending on a target fabricated object, the size of the flow path structure body 1 becomes large, and the heating plate 4, namely the insulating substrate 41 becomes larger accordingly. It should be noted that a plurality of the insulating substrates 41 may be formed for one flow path structure body 1. Therefore, while the insulating substrate 41 having a size necessary for an intended use is used, for example, an alumina substrate of about 10 mm square and about 0.6 mm thick is used for two flow paths 12. Therefore, when twelve flow paths 12 are formed, the size will be about 10 mm×60 mm. The outer shape is also not limited to a rectangle, and is formed to the shape necessary for the flow path structure body 1. This insulating substrate 41 is generally formed into a size of from about 5 mm square to about 35 mm square, but the size is not limited thereto, and may be, for example, a large size of 10 mm×220 mm, and a long one to the number of discharge openings of the line head can be formed. Further, the size of the insulating substrate 41 may be matched with the size of the line head by arranging a plurality of heating plates 4.

A temperature coefficient, a resistance value and the like of the heater (heating element) 42 are adjusted to be optimum values by properly selecting and mixing powders of, for example, Ag, Pd, $RuO_2$, Pt, metallic oxides, glass and the like. This mixture material is formed into a paste which is then coated and baked. Thus, the heating element 42 is formed. A sheet resistance of a resistance film to be formed by the baking can be changed by adjusting an amount of a solid insulating powder. A resistance value and a temperature coefficient can be changed by a ratio of the both. Further, a similar material in the form of paste in which a ratio of Ag is increased and a ratio of Pd is decreased is used as a material to be used for conductors (first and second conducting terminals 43, 44). Thus, the conductors can also be formed by printing in the same manner as in the heating element 42. In view of the connection of the terminals, a resistance value and a temperature coefficient need to be changed depending on a service temperature. As a ratio of Ag is increased, a resistance value can be decreased.

The heating plate 4 is configured such that as shown in FIG. 1A, power source is connected to the heating element 42 by connecting a lead 47 to the first and second conducting terminals (electrodes) 43, 44. This power source is such that a pulse voltage is applied instantaneously.

In the example shown in FIG. 5A, the first conducting terminal 43 is formed as a common electrode, by coupling each tip of the heaters 42 provided along a plurality of the flow paths 12. And each of the second conducting terminals 44 is lead out as an individual terminal, and a signal can be applied to individual flow path 12. It should be noted that, in FIG. 5A, 45 is a formation range of a protective film for covering and protecting surfaces of the heaters 42 and the conducting terminals 43, 44. The discharge amount is increased by increasing a voltage applied to the heaters 42. The discharge amount can be also increased when the heating elements (the heaters 42) are formed at two positions and heating is conducted at different timings. Examples thereof will be described below.

Figure 5C:
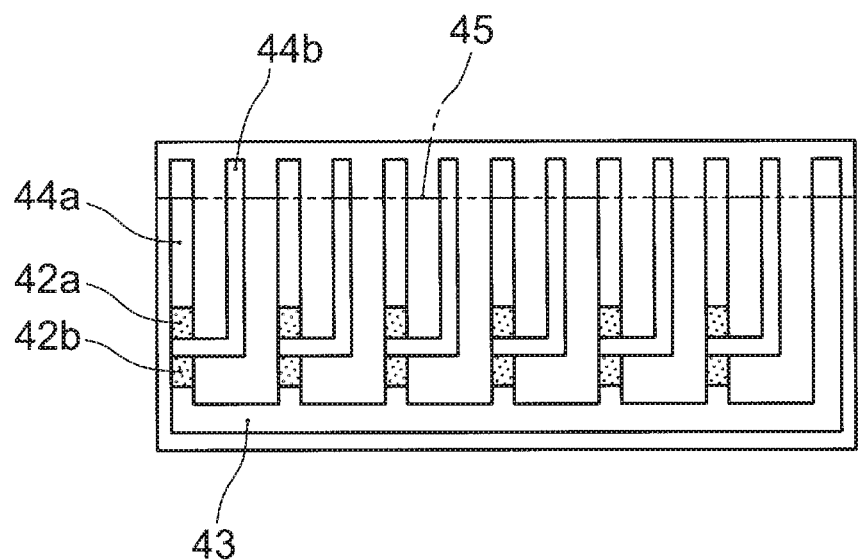
FIG. 5C is a plan view illustrating other example of the heating plate of FIG. 1A where the cover substrate is removed.

Namely, as shown in FIG. 5C, the heater (the heating element) 42 is divided into two or more, and a voltage may be applied separately and individually to a first heater 42*a* and a second heater 42*b*. Specifically, in FIG. 5C, 44*a* is a third conducting terminal and 44*b* is a fourth conducting terminal, and, in this example, the fourth conducting terminal 44*b* is connected to a portion where the first heater 42*a* and the second heater 42*b* are connected in series. As a result, when a voltage is applied between the first conducting terminal 43 and the third conducting terminal 44*a*, this example becomes virtually same as the example shown in the above-mentioned FIG. 5A. On the other hand, when a voltage is applied between the first conducting terminal 43 and the fourth conducting terminal 44*b*, only the second heater 42*b* is heated. Also, when a voltage is applied between the third conducting terminal 44*a* and the fourth conducting terminal 44*b*, only the first heater 42*a* is heated. These voltage applications of the both cases can be conducted continuously at intervals of several milliseconds to several tens milliseconds. By signal voltage application in a manner like this, various controls of the discharge amount can be conducted.

To this heating plate 4, from the viewpoint of microscopic discharging of the deposition materials to a fabricated object, preferably a pulsed voltage is applied as mentioned above. Although the duration of this pulsed voltage application is as very short as about several milliseconds, the temperature of the heaters 42 is raised instantly, its heat is transmitted to the piece 32, and deformation occurs between the piece 32 and the thin plate 31 or between the piece 32 and the second piece 33. The deformation of the thin plate 31 causes the deposition material to be discharged from the discharge opening 13. This application of a pulsed voltage is performed in the same manner as in application of each pixel signal in a normal thermal printer (for example, see JP S57-98373 A), by inputting data serially to a shift register, and performing a voltage application to only necessary parts by parallel-out. For controlling a heating amount, a duration of pulse application can be changed by setting a latching circuit between this shift register and an AND circuit.

Figure 6A:
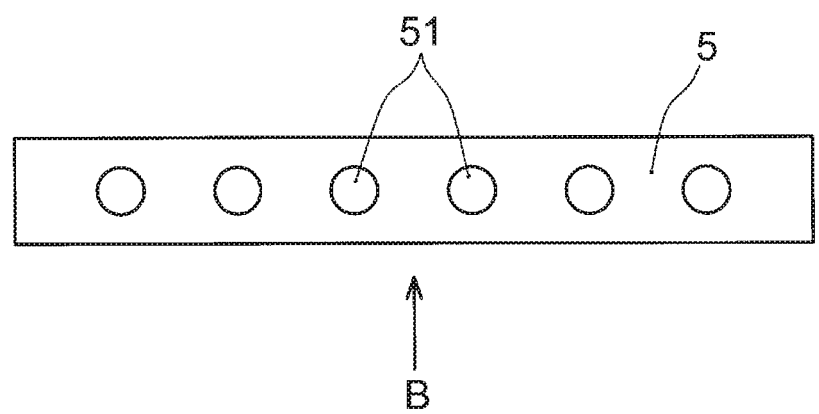
FIG. 6A is an explanatory view of the top surface side of the flow path structure body of the printhead shown in FIG. 1A showing the side of the fabrication material introducing openings (the side of the attaching plate) in other structural example of the flow path structure body thereof.
Figure 6B:
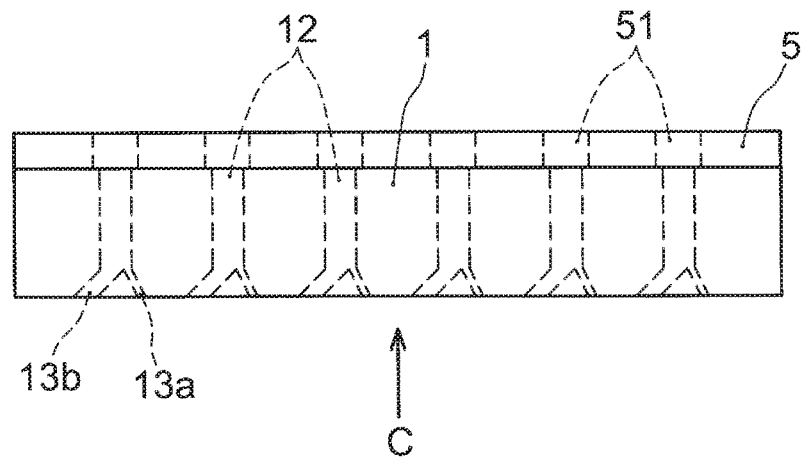
FIG. 6B is a plan view of FIG. 6A seen in a direction of arrow B.
Figure 6C:
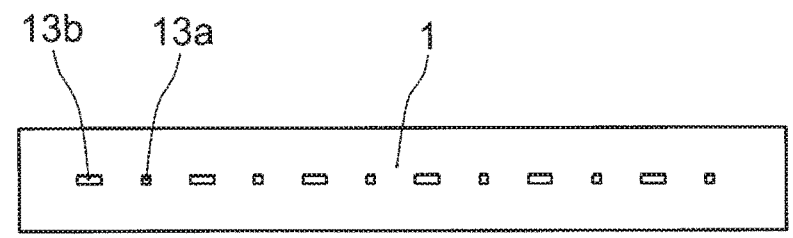
FIG. 6C is a plan view of FIG. 6B seen in a direction of arrow C.
Figure 6D:
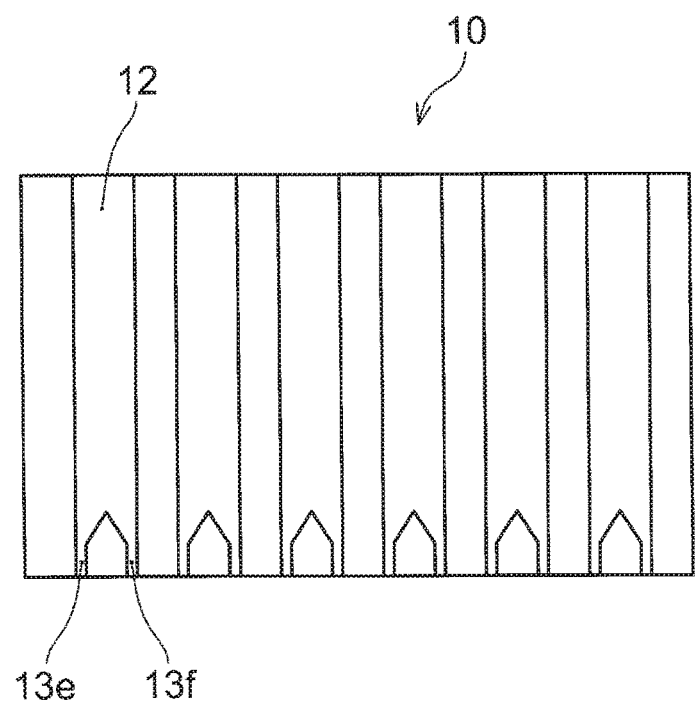
FIG. 6D is a view illustrating other example in which two discharge openings are formed for one flow path.

The flow paths 12 are formed in a plurality of rows as shown in the above-mentioned FIG. 3 so that a line type printhead in which the discharge openings 13 are arranged in parallel rows is obtained as shown in FIG. 1B. However, one discharge opening 13 is not necessarily provided for one flow path 12. Specifically, as shown in FIG. 6A showing a view seen from the attaching plate 5 introducing the deposition materials on the side opposite to the discharge openings, FIG. 6B showing a view seen from a direction of an arrow B of FIG. 6A, and FIG. 6C showing a view seen from an arrow C of FIG. 6B, namely a view seen from the discharge openings 13 side (a simplified view without its layer structure), respectively, a small discharge opening 13*a* and a large discharge opening 13*b* are formed in a single flow path 12, and a printhead in which the large discharge openings 13*b* and the small discharge openings 13*a* are alternately and parallelly arranged in line is obtained. The size and shape of these discharge openings 13 are not limited to those of this example. The discharge openings can be formed in a combination of any shapes. It should be noted that a barrel is not attached to the attaching plate 5 as mentioned before, and the openings 51 are formed so as to communicate with the deposition material supply openings 14 (see FIG. 3). The deposition materials can be discharged from the both of the discharge openings 13*a*, 13*b* at the same time, or the deposition materials can be discharged from one of them, while the other is closed. The discharge openings 13 may diverge in a configuration such that, as shown in FIG. 6D, same-size discharge openings 13*e*, 13*f* are formed on opposite lateral sides of the end of the flow path 12.

As the discharge openings 13 are formed in this manner, a pitch between the discharge openings 13 is narrower, and thus more delicate and refined fabricated object can be manufactured. It should be noted that these discharge openings 13*e*, 13*f* may be formed not in a single row but in two or more rows. By increasing the number of the plates 10 of the flow path structure body 1 to be put together, a lot of the discharge openings 13 in more than one row can be formed from a single flow path 12. Thus, when a plurality of the discharge openings 13 are formed to be connected to one of the flow paths 12 as described above, a variation of fabricated objects can be obtained. Also, for such fine fabrication, so-called a shuttle system, in which a printhead is moved by about a half pitch in the x-axis direction, may be adopted. The fabrication (forming) table can be moved in the y-axis and z-axis directions as well. By doing so, one movement in the y-axis direction can stack two layers and possibly three or more layers as well.

Figure 7A:
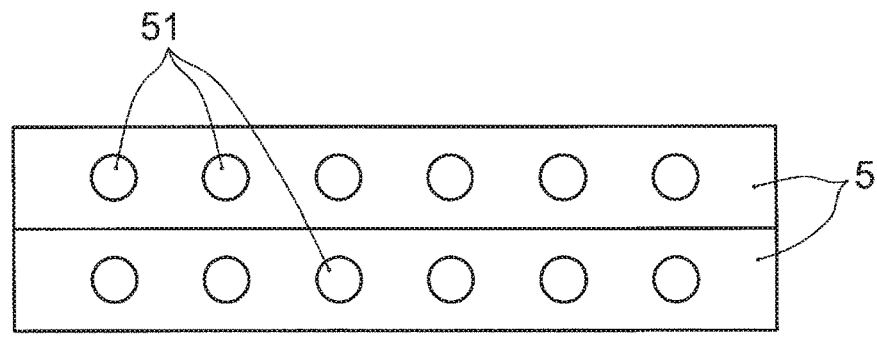
FIG. 7A is an explanatory view of the top surface side, which is similar to FIG. 6A, seen from the side of the attaching plate where two flow path structure bodies are jointed with a partition plate, which is not shown, interposed therebetween.
Figure 7B:
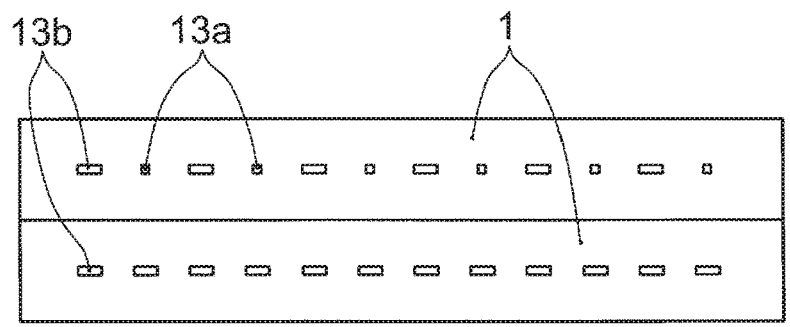
FIG. 7B is a plan view similar to FIG. 6C which shows the side of the discharge openings of the FIG. 7A.

In FIGS. 7A-7B, two flow path structure bodies 1 shown in FIG. 1A are put together via a closing plate, which is not illustrated, and at both sides thereof are provided the thin plate 31 and the heating plate 4 which are not illustrated. As a result, a two-row line head is obtained, in which both the openings 51 and the discharge openings 13*a*, 13*b* are formed respectively in two rows. The similar drawings as FIG. 6A and FIG. 6C are shown in FIG. 7A and FIG. 7B, respectively. In this example, two flow path structure bodies 1 having different formation of the discharge openings 13 are put together. With this configuration, plural kinds of deposition materials comprising different materials or plural kinds of deposition materials with different colors can be used. In addition, one layer of a multicolored and uneven fabricated material can be formed by a single scan.

Figure 8A:
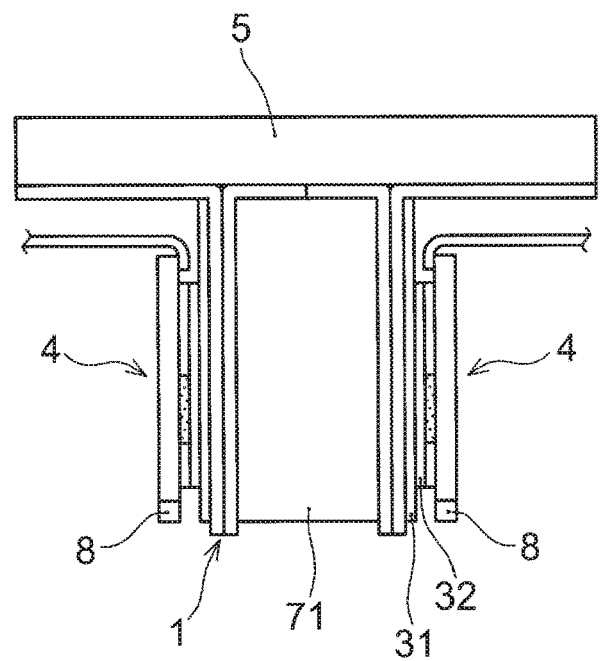
FIG. 8A is a view similar to FIG. 1A which illustrates an example of a printhead in which two of the printheads of FIG. 1A are bonded and the discharge openings are formed in two rows.

FIG. 8A is an example in which two printheads shown in FIG. 1A are bonded together with a thick closing plate 71 interposed therebetween so that the surface on the side opposite to heating plate 4 of printhead face each other. It should be noted that the number of the printheads to be jointed is not limited to two. By doing so, line heads having a plurality of the discharge openings 13 are formed in two lines as shown in a plan view of FIG. 8C seen from the side of the discharge openings 13*a*, 13*c*. In the printhead dispensing deposition material, the line heads are formed in two rows, and, in addition, the discharge openings 13 can be different sizes, as shown in FIG. 8C, in the discharge openings 13*a* and the discharge openings 13*c*. Thus the discharge amount of the deposition material can be changed freely. It is a matter of course that in the two rows, the sizes of the discharge openings 13*a*, 13*c* may be further changed. In FIG. 8A, 8 is an LED for curing the photo-curable resin. In addition, in FIG. 8A, the protection film 45 of the heating plate 45 is omitted and not shown therein.

Figure 8B:
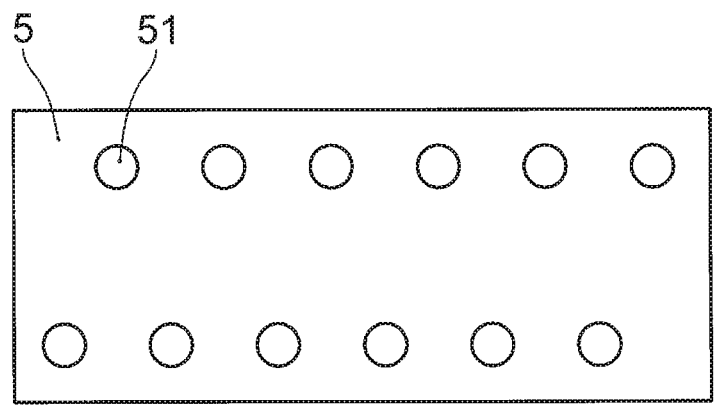
FIG. 8B is a plan view showing the side of supply openings (the side of attaching plate) of FIG. 8A.
Figure 8C:
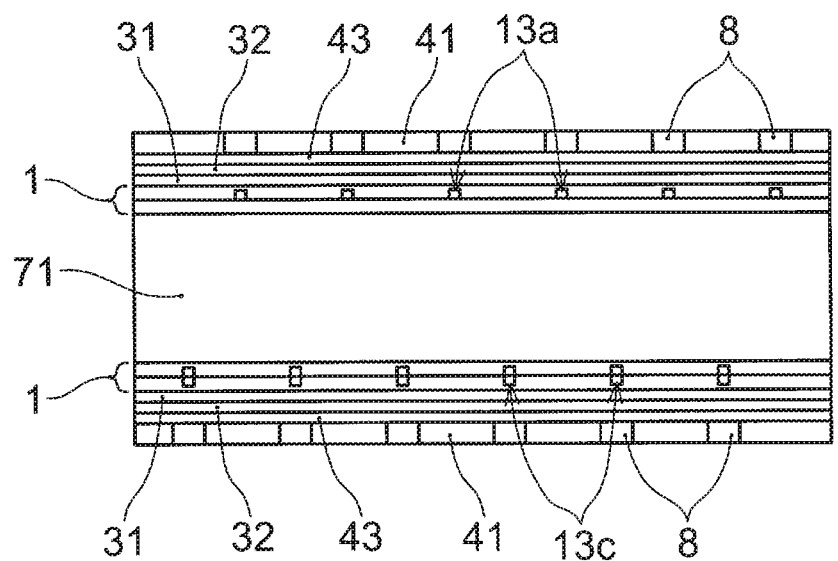
FIG. 8C is a plan view showing the side of the discharge openings of FIG. 8 A.

FIG. 8B is a plan view seen from the side of the attaching plate 5. As is evident from FIG. 8B and FIG. 8C, the two rows of the line heads may be formed so that positions of the flow paths are shifted by a half pitch. The discharge openings 13 are also formed to be shifted by a half pitch. When a plurality of rows of the line heads are formed and there is a combination of rows shifted by a half pitch, lacking of the deposition material between the pitches is prevented, and a highly precise fabricated object can be manufactured. With these configurations, multiple kinds of deposition materials comprising different materials or multiple kinds of deposition materials with different colors can be used. In addition, two or more layers of a multicolored and uneven fabricated object can be formed by a single scan. In this case, too, as in the cases of the above-mentioned FIG. 6C and FIG. 6D, the number of discharge openings 13 can be increased, and the discharge openings 13 do not need to be aligned in a single row. Also, the discharge openings 13 do not need to be shifted by a half pitch. It should be noted that, in FIG. 8B, 5 is an attaching plate, and 51 are openings leading to the material supply openings. Also, when the discharge openings 13 are formed in a plurality of rows in this manner, positions of the discharge openings 13 in the vertical direction can be easily changed depending on the rows. Two pairs of the printheads can be obtained just by bonding them together to be shifted each other. By shifting, for example, by about 1 mm in the vertical direction, two or more layers of a fabricated object can be formed by a single scan, and thus the fabricated object can be manufactured faster.

Figure 9A:
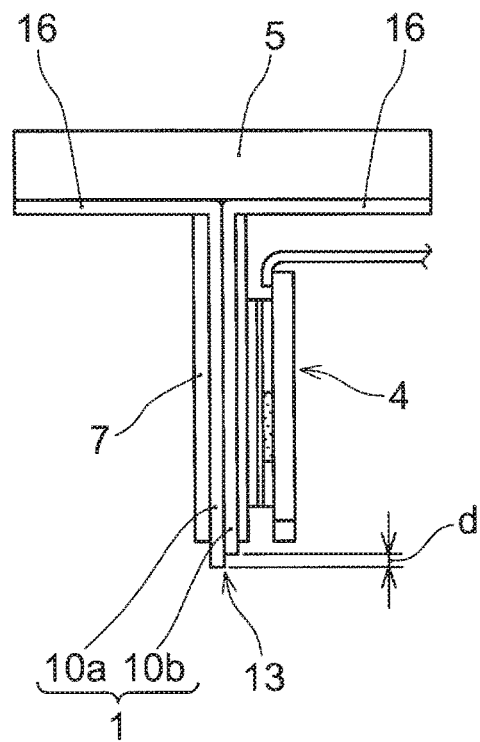
FIG. 9A is a view showing a variation of the structure of the part of the discharge openings.

Also, when there are a lot of the flow paths 12 and a plurality of the discharge openings 13 are formed in line as in the manner mentioned above, even a multicolor-type fabricated object or the like can be manufactured easily. In addition, it is also easier for a base resin and a curative agent to be discharged separately and mixed together. As shown in FIG. 9A where a similar figure of the printhead to FIG. 1A is shown in a schematic view, at a tip of the flow path structure body 1 on the side of the discharge openings 13, a position shift is formed in an extending direction of the flow paths 12 and a level difference "d" can be formed there. The level difference is formed by changing the lengths of the two plates 10. Also, even though the flow path structure body 1 does not have a level difference, two or more printheads may be used being put together so that there is a level difference at the discharge openings at the tip. Specifically, the printheads are arranged in a plurality of rows in a direction intersecting with the fabrication table, wherein vertical heights of the rows of the discharge openings are different in at least two rows of the plurality of the rows, and at least two layers of a fabricated object can be formed by a single scan in the x-y direction of the fabrication table provided below the rows of the discharge openings.

When the height of a discharged deposition material is, for example, about 1 mm, the level difference "d" is also set to be about 1 mm, and the fabricated object is scanned from a direction of the plate 10*a* which is longer in a scan direction of the fabrication table to a direction of the plate 10*b* which is shorter in the scan direction so that the discharged deposition material is not be shaved by the printheads even when the deposition material is discharged continuously. As a result, a finely fabricated object can be formed. On the contrary, the level difference can be formed so as to shave off a top of the discharged deposition material. By doing so, a finely fabricated object with a flat surface can be formed. The purpose of making such a shape is to make the surface flat to enable the next layer to be adhered easily, and make the material to be discharged and adhered easily when changing characteristics, viscosity, and the like of the material. Making such a shape also allows for a certain degree of processing of the printed object, such as maintaining a constant thickness of the printed object, maintaining constant intervals between dents, and the like.

Figure 9B:
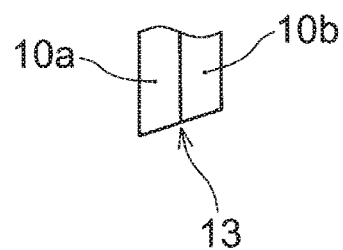
FIG. 9B is a view showing another variation of FIG. 9A.
Figure 9C:
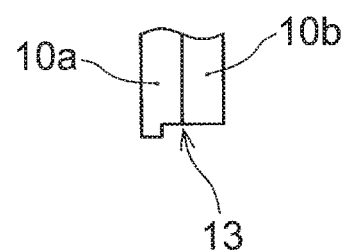
FIG. 9C is a view showing other variation of FIG. 9A.
Figure 10:
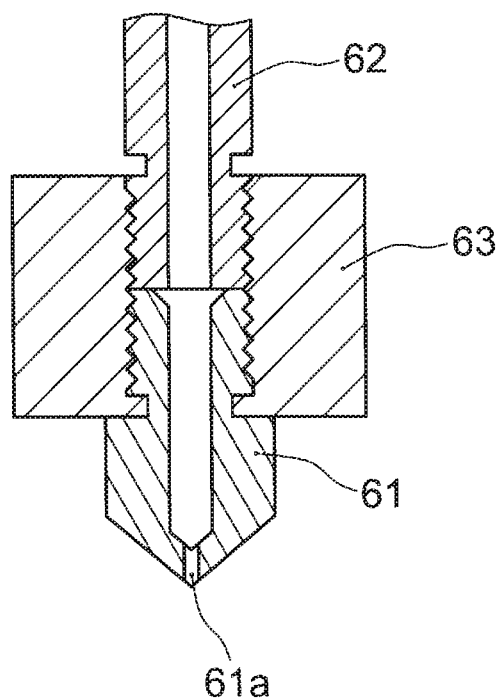
FIG. 10 is an explanatory sectional view showing one example of a conventional nozzle for discharging a deposition material.

Also, instead of the level difference, as shown in FIG. 9B, two plates 10*a*, 10*b* may be configured to be cut in an oblique direction. That also prevents breaking of the discharged deposition material by the printhead in a similar manner. It should be noted that in FIGS. 9B and 9C, only the part of the discharge opening 13 is shown. Furthermore, in the example shown in FIG. 9C, the level difference is not formed between the two plates 10a, 10b, but about a half of a thickness of the one plate 10a and the entire surface of another plate 10b are dented. When a large amount of the deposition material is discharged, an enough room is secured for spreading of the discharged deposition material. It should be noted that, in FIG. 9A, the heating plate 4, and others are conceptionally shown.

In addition, although it is not shown, the tip of the printhead may be scanned relative to the fabricated object while the printhead is discharging the deposition material in a state of the tip of the printhead being inclined to the fabricated object without facing the fabricated object at a right angle. By doing so, even when the deposition material is discharged continuously, the same effect can be obtained as in the case where the above-mentioned level difference is formed, or the tip is cut in an oblique direction. A thick, fabricated object becomes easier to be obtained. In other words, by changing the shape of the tip of printhead or adjusting the setting angle in accordance with the shape of the fabricated object, even a thick, fabricated object can be formed efficiently.

According to these embodiments, because the deposition material can be suitably discharged from a specific discharge opening 13 of a plurality of the discharge openings 13 by the heating plate 4, for example, while the fabrication table is being scanned, the deposition material can be discharged only on a particular spot on the fabricated object. Also, when a plurality of the discharge openings are formed, two or more spots of the fabricated object can be formed at the same time. In addition, when a plurality of the discharge openings are formed, the discharge amount can be changed by changing the size of the discharge openings. Furthermore, deposition materials of various colors can be discharged. Specifically, the deposition materials can be mixed after being discharged, or deposition materials comprising various colors and materials mixed in advance are prepared so that desired deposition materials are discharged on desirable spots respectively from different discharge openings. As a result, even a large fabricated object can be manufactured freely in a short time.

Also, when a plurality of the printheads having a plurality of the discharge openings formed in line are placed side by side, the number of the discharge openings are further increased, and fabricated objects can be formed at a lot of positions at one time by a single scan. With this configuration, when a two-liquid resin is used, a base resin is discharged from the discharge openings of the first row and a curing agent is discharged from the discharge openings of the next row, thereby making it possible to perform reactive curing. In addition, when the discharge openings of a plurality of rows of the printheads are shifted per row in a vertical direction, first, the deposition material is discharged by heads having lower-position discharge openings, and then the deposition material is discharged by a row of the higher-position discharge openings in the same scanning process so that two or more layers of the fabricated objects can be formed by a single scan. Thus, even a large, fabricated object can be formed in a very short time.

According to the method of the present invention for discharging the deposition material by deformation of the thin plate by the thermal strain generating member or for discharging the deposition material by temperature increase of the deposition material in the flow paths, discharging of the deposition material can be controlled instantaneously (several milliseconds to several tens milliseconds), and thus the deposition material can be discharged while the fabrication table is being scanned, and therefore, even a large, fabricated object can be manufactured very easily.

In addition, according to the method of this embodiment of the present invention for discharging the deposition material in which the deposition material can be discharged by changing the height of the discharge openings in each of the heads of a plurality of rows in line, two or more layers of a fabricated object can be formed by a single scan, and thus even a large, fabricated object can be formed in a short time. It should be noted that the thickness of each layer can be changed as well.

EXPLANATION OF SYMBOLS 1 flow path structure body
1a flow path plate
3 thermal strain generating member
4 heating plate
5 attaching plate
7 closing plate
8 LED
10 plate
12 flow path
13 discharge opening
14 material supply opening
15 groove
16 attaching portion
31 thin plate
32 piece
32a coupling portion
32b hat portion
33 second piece
41 insulating substrate
42 heater (heating element)
43 first conducting terminal
44 second conducting terminal

What is claimed is:

1. A printhead dispensing a deposition material comprising:
a flow path structure body, wherein the flow path structure body is formed by jointing plural plates of a substantially same shape, each plate having a through-hole with an elongate cross-section so that the through-holes of the joint plural plates are aligned with each other forming a joint through-hole in the joint plural plates, and closing both ends of the joint through-hole, to form a flow path in a direction vertical to the joint through-hole and in a lengthwise direction of the joint through-hole with the elongate cross-section, and to have a discharge opening communicating with the flow path, the discharge opening being formed at tips of at least one of the plates,
a thin plate for closing one surface of the flow path on one end side of the joint through-hole so as to seal the flow path on the one end side of the joint through-hole,
a heating plate disposed at the side of the thin plate opposite to the flow path with the thin plate provided therebetween and applying a heating effect to the inside of the flow path,
a closing plate disposed on the other surface of the flow path, the other surface being the other end side of the joint through-hole so as to seal the flow path on the other end side of the joint through-hole, and
a light-emitting element disposed near the discharge opening to emit a light along the direction of the flow path.

2. The printhead dispensing a deposition material of claim 1, wherein a plurality of the flow paths with elongate through-holes is disposed in parallel on the plates, and the heating plate is formed so that the heating effect can be applied to each specific flow path among the plurality of flow paths.

3. The printhead dispensing a deposition material of claim 1, wherein a thermal strain generating member is jointed between the thin plate and the heating plate, and the deposition material in the flow path is discharged by deformation of the thin plate due to heating of the thermal strain generating member by instantaneous heating of the heating plate.

4. The printhead dispensing a deposition material of claim 1, wherein the deposition material in the flow path is discharged by increase in a volume of the deposition material due to thermal expansion of the deposition material in the flow path or the thin plate along the flow path by the heating plate or a change in a volume of the flow path due to expansion of the thin plate.

5. The printhead dispensing a deposition material of claim 1, wherein the heating plate is formed such that a heating element is formed on an insulating substrate along each of the flow paths so as to be capable of heating a thermal strain generating member of a specific flow path or the deposition material in the specific flow path or the thin plate.

\* \* \* \* \*